(No Model.)

S. ADLAM, Jr.
Sleeve Button or Stud.

No. 236,403.                    Patented Jan. 11, 1881.

Witnesses
N. J. Cambridge
Chas. E. Griffin

Inventor,
Samuel Adlam Jr.
per H. Teschemacher
Atty.

N. PETERS, PHOTO-LITHOGRAPHER, WASHINGTON, D. C.

UNITED STATES PATENT OFFICE.

SAMUEL ADLAM, JR., OF BOSTON, MASSACHUSETTS.

SLEEVE BUTTON OR STUD.

SPECIFICATION forming part of Letters Patent No. 236,403, dated January 11, 1881.

Application filed June 28, 1880. (No model.)

*To all whom it may concern:*

Be it known that I, SAMUEL ADLAM, Jr., a citizen of the United States, residing at Boston, in the county of Suffolk and State of Massachusetts, have invented an Improvement in Cuff Buttons or Studs, of which the following is a full, clear, and exact description, reference being had to the accompanying drawings, making part of this specification, in which—

Figure 1:
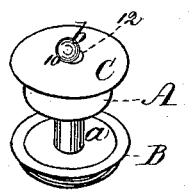
Figure 2:
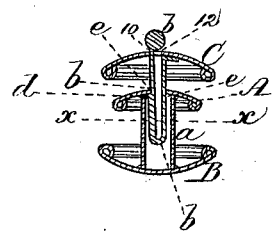
Figure 3:
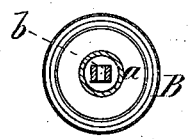
Figure 4:
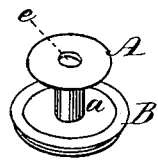
Figure 5:
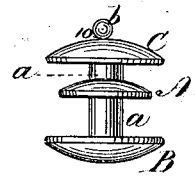

Figure 1 is a perspective view (enlarged) of a cuff button or stud constructed in accordance with my invention. Fig. 2 is a vertical section through the center of the same. Fig. 3 is a horizontal section on the line $x\,x$ of Fig. 2. Fig. 4 is a perspective view of the main portion of the stud, the removable portion being detached therefrom. Fig. 5 is a modification to be referred to.

Detachable cuffs are usually fastened to the wristbands of a shirt by means of buttons or studs, which, on account of the many thicknesses of cloth through which they must necessarily pass and the great stiffness of the starched cuff, are often extremely difficult to use and occasion much trouble and inconvenience.

My present invention has for its object to overcome this difficulty; and it consists in a cuff button or stud composed of two heads or disks united by a hollow post or shank open at one or both ends, and adapted to fasten the ends of the wristband together and remain therein, in combination with a third or outer disk or head provided with a stem or shank which is adapted to enter the hollow post and be locked therein by a spring-catch of peculiar construction in such a manner as to confine the detachable cuff between the outer disk and one of the heads of the stud, the shank of the outer head passing easily through the button-holes or eyelets of the cuff, and affording a ready and convenient means of attaching or detaching the latter, while the main portion of the stud is allowed to remain undisturbed in the wristband of the shirt.

In the said drawings, A B represent the two disks or heads of the main portion of the stud, which are united by means of a hollow post or shank, $a$, which is open at one end, as shown in Figs. 2 and 4. If desired, the opposite head, B, may be also provided with a central perforation in line with the hollow post $a$, so as to leave both ends of the latter open instead of one only.

C is a third or outer head or disk, which may be made of any suitable diameter and bear any desired device or ornamentation, and from the center of the inner side of this disk projects a shank or stem, $b$, which is composed of a piece of spring metal bent double, and adapted to enter the hollow post $a$, one portion of the shank being provided with a shoulder or projection, $d$, which springs out and catches under a lip or shoulder, $e$, at one end of the hollow post $a$, as seen in Fig. 2, thus firmly holding or locking the outer head, C, to the main portion A B of the stud. The portion 10 of the shank $b$ extends up through an aperture, 12, in the head C, so as to allow of its being easily pressed back by the finger to release or unlock the catch and allow of the withdrawal of the shank $b$ from the post $a$ when it is desired to separate the head C from the remaining portion of the stud.

Any suitable locking or fastening device other than that shown may be employed, if desired, for holding the outer head, C, to the main portion of the stud.

The portion A $a$ B, Fig. 4, is first inserted within the button-holes of the wristband, and is used as an ordinary stud to confine their ends together, being allowed to remain undisturbed therein while the shirt is being worn. When the cuff is to be attached it is slipped, as usual, over the wristband, and the head C is then taken up and its shank $b$ passed from the outside through the button-holes or eyelets of the cuff and inserted within the end of the shank $a$, into which it is forced until it is locked by the spring-catch $d$, when the cuff will be securely confined between the head A and the outer head, C, the operation being simple and free from any inconvenience or delay; and when it is desired to remove the cuff it is merely necessary to unlock the catch and withdraw the shank $b$ from the post $a$ by taking hold of the head C, when the cuff may be slipped off, leaving the main portion of the stud still in place, so as to confine the ends of the wristband together, as before stated.

A stud constructed in accordance with my invention presents a great advantage over the ordinary separable button or stud provided with two heads or disks, for the reason that when the latter is removed to allow the cuff to be taken off the ends of the wristband are left loose and have to be again fastened together with a stud, or otherwise, by a subsequent operation; whereas with my improved stud the head C is used only to confine the cuff to the wristband, and after the cuff has been removed the main portion of the stud still remains undisturbed as a permanent fastening for the ends of the wristband, the attachment or detachment of the cuff being accomplished without any of the annoyance so frequently experienced with the ordinary studs and buttons heretofore used for this purpose.

The catch or projection $d$ and the flange or lip $e$ are so placed with relation to each other that when the outer disk, C, is locked in place, a sufficient space will be left between its inner surface and the disk A to accommodate the cuff, as required, and, if desired, the hollow post $a$ may extend beyond the disk A, as seen in Fig. 5, so as to serve as a guide and also as a stop for the inner side of the head C to rest against.

It is evident that my invention is equally applicable to collar buttons and studs and buttons for various other purposes as well as to sleeve-buttons.

I am aware that a great variety of buttons and studs have been constructed in which one portion or head is made separable from the other portion, to facilitate its insertion within the garment or its removal therefrom. To this feature, therefore, I lay no claim; but

What I claim as my invention, and desire to secure by Letters Patent, is—

In a separable button or stud, the combination, with the main portion A $a$ B, of the third or outer disk or head, C, provided with a shank, $b$, fitting within the hollow post $a$, and having a catch or locking device adapted to be released by operating a projection, 10, extending outside the face of the disk C, substantially as described.

Witness my hand this 24th day of June, A. D. 1880.

SAMUEL ADLAM, Jr.

In presence of—
P. E. TESCHEMACHER,
W. J. CAMBRIDGE.